United States Patent [19]
Kinnune, Jr.

[11] 3,854,426
[45] Dec. 17, 1974

[54] LOCKING MEANS FOR SUSPENSION MEMBER IN SUSPENDIBLE LOAD SPACER

[75] Inventor: William P. Kinnune, Jr., Portland, Oreg.

[73] Assignee: Western-Kraft Corporation, Portland, Oreg.

[22] Filed: May 4, 1973

[21] Appl. No.: 357,358

[52] U.S. Cl.................105/486, 403/100, 403/346
[51] Int. Cl............................................. B61d 45/00
[58] Field of Search........ 24/81 CR, 81 AE, 81 AT, 24/81 CC; 16/139, 143, 145; 105/367, 369 B, 369 S; 248/282, 284; 403/91, 92, 94, 326; 52/665; 292/209, 107, 80, 87

[56] References Cited
UNITED STATES PATENTS

| | | | |
|---|---|---|---|
| 1,090,811 | 3/1914 | Bronson | 403/92 |
| 1,242,202 | 10/1917 | Keller | 16/139 |
| 2,088,698 | 8/1937 | Gosselin | 24/81 AE |
| 2,718,407 | 9/1955 | Welsh | 403/92 X |
| 3,618,535 | 11/1971 | Hees | 105/369 B |

Primary Examiner—M. Henson Wood, Jr.
Assistant Examiner—Gene A. Church
Attorney, Agent, or Firm—Kolisch, Hartwell, Dickinson & Stuart

[57] ABSTRACT

A load spacer including an expandable-collapsible honeycomb-like structure, the top of which is stiffened by an elongated rib, on which are pivoted a pair of spaced-apart elongated suspension members. A locking device is provided for each suspension member, such taking the form of a springy plate joined to the member, and including a downwardly biased downturned portion to one side of the member. Each downturned portion includes a downwardly facing central notch that releasably catches the rib when the associated suspension member is swung to a suspending position. Cam surfaces formed on either side of each notch allow the associated downturned portion to climb automatically over the rib as the associated suspension member is swung in either direction toward its suspending position.

7 Claims, 4 Drawing Figures

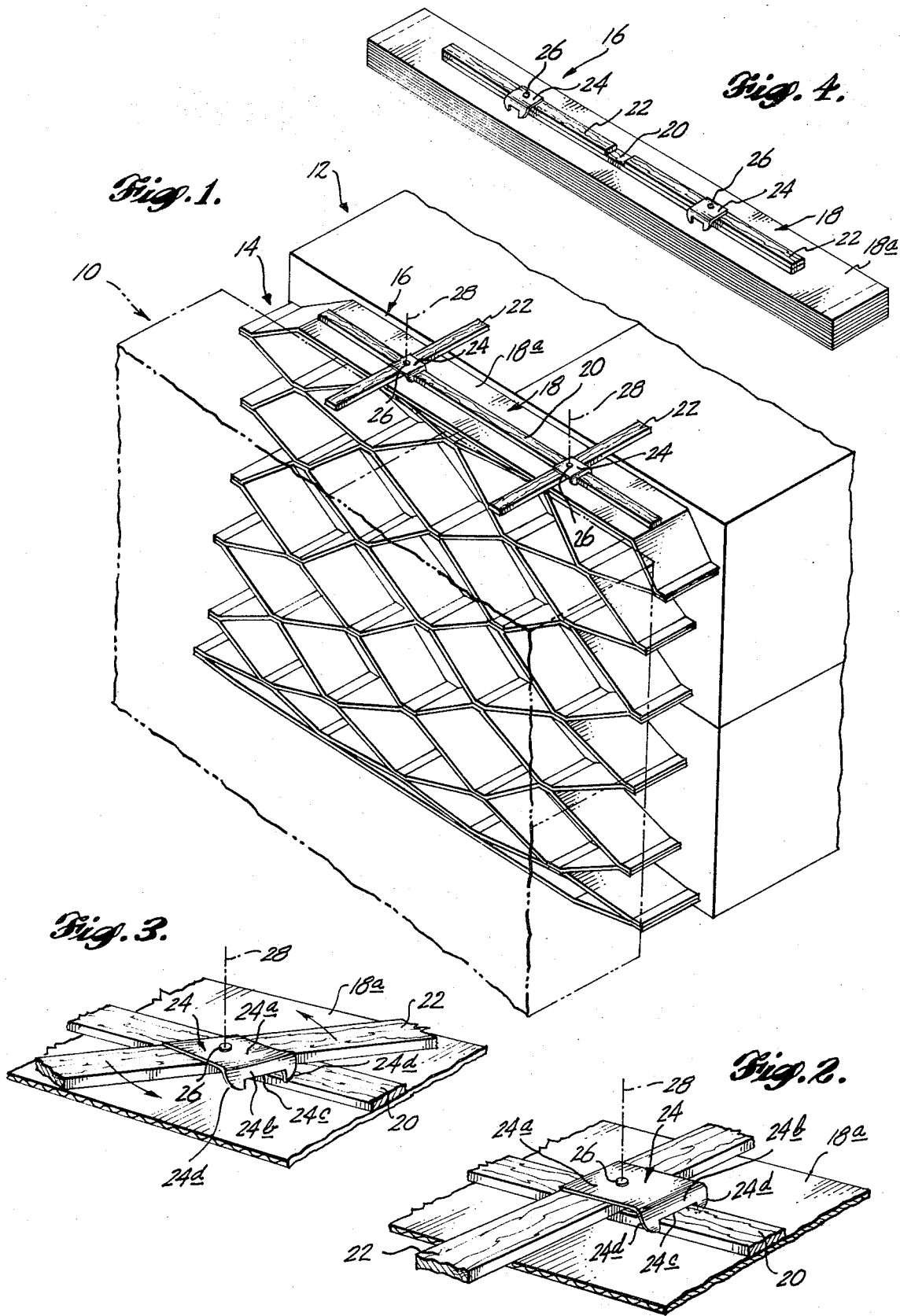

LOCKING MEANS FOR SUSPENSION MEMBER IN SUSPENDIBLE LOAD SPACER

BACKGROUND AND SUMMARY OF THE INVENTION

This invention pertains to a load spacer, and more specifically to such a spacer which is adapted to be suspended (between a pair of loads that are to be held apart) by one or more pivoted adjustable suspension members. Such a suspension member may be swung to a stored position when the spacer is out of use, and to an extended suspending position when the spacer is to be used. In particular, the invention concerns a device in such a load spacer for automatically releasably locking each suspension member in its suspending position.

In the loading of a freight container, such as a railroad boxcar, it often happens that the loads placed therein do not completely fill the available horizontal storage space. Frequently, there are left one or more generally planar vertical spaces between closely adjacent loads in the container, which spaces should be filled with something sturdy to prevent potentially damaging load movement during transit.

Various sorts of load spacers or fillers have been proposed in the past for the purpose indicated. One popular type comprises an expandable-collapsible honeycomb-like structure, the top of which is stiffened by an elongated rib on which are pivoted a pair of spaced-apart elongated suspension members. When the spacer is out of use, the suspension members are swung to positions with their extremities inwardly of the opposite sides of the spacer. When the spacer is put in use, the suspension members are swung to suspending positions, where their extremities extend outwardly of both sides of the honeycomb structure so as to be capable of resting on the tops of loads, on opposite sides of the space to be filled, thus to suspend and support the spacer in such space. When put to use, of course, the honeycomb structure expands vertically downwardly into the space.

One of the problems with such construction is that the usual jostling which occurs during transit can cause one or more of the suspension members accidentally to creep back to a position where it no longer supports the honeycomb structure. Naturally, this is undesirable since, if the honeycomb structure is allowed to collapse during transit, load packages can easily shift and be damaged.

A general object of the present invention, therefore, is to provide a novel locking device usable in a load spacer of the type generally described, which device is capable of automatically and releasably locking its associated suspension member in a suspending position.

The advantage of such a device is immediately obvious. For, with such a device used, a suspension member cannot creep to a nonsupporting position during load transit.

According to a preferred embodiment of the invention, the locking device takes the form of a springy plate for each suspension member, joined thereto and including a downwardly biased downturned portion which extends to one side of the member. The downturned portion includes a downwardly facing central notch that releasably catches the rib in the spacer when the suspension member is swung to its suspending position. Cam surfaces formed on either side of the notch allow the downturned portion to climb (with bending in the plate) automatically over the rib as the suspension member is swung in either direction toward its suspending position.

The locked condition of a suspension mamber may, of course, easily be manually released when the spacer is to be removed from use.

Various other objects and advantages attained by the invention will become apparent with a reading of the disclosure below in conjunction with the accompanying drawings.

DESCRIPTION OF THE DRAWINGS

FIG. 1 is a fragmentary top perspective view of a load spacer constructed according to the invention placed in use between two stacks of cartons.

FIG. 2 is an enlarged fragmentary perspective detail illustrating a suspension member and a locking device in the spacer of FIG. 1.

FIG. 3 is a view similar to FIG. 2, but showing a suspension member and a locking device in different positions.

FIG. 4 is a top perspective view of the load spacer of FIG. 1 in a fully collapsed condition, suitable for storage.

DETAILED DESCRIPTION OF THE INVENTION

Turning now to the drawings, and referring first to FIG. 1, indicated generally at 10 and 12 are two stacks of cartons, or loads, spaced apart by an upright generally uniform-width gap, or space, 14. These stacks, with the space between them might typically be found in a load container such as a railroad boxcar after loading of the boxcar. Stacks 10, 12 are of essentially the same height. Stack 10 is shown only in phantom outline so as better to reveal a load spacer 16 which has been placed (as will be explained) between the stacks. Spacer 16 is constructed in accordance with the present invention.

Spacer 16 includes, essentially, four different kinds of components, namely: an expandable-collapsible honeycomb, or spacing structure, 18; an elongated stiffening rib 20, which is joined to and extends a substantial distance along the top piece in honeycomb 18; a pair of elongated suspension members, or bars, 22; and a pair of locking devices 24, one for each bar 22.

Honeycomb 18 herein is conventional in construction, and comprises elongated uniform-width strips of sheet material, such as double-faced corrugated paper board—these strips being arranged generally in a stack, and being joined to vertically adjacent strips at spaced and staggered positions. With such construction, the honeycomb, when placed as shown in FIG. 1, can expand vertically downwardly, with adjacent strips in the honeycomb bending relative to one another to form the open, multiple-cellular configuration illustrated in FIG. 1. The number of strips used in the honeycomb is a matter of choice. Also a matter of choice is the width of the strips. Typically, a sufficient number of strips is included to permit a spacer to expand easily between about 4–6 feet. Strip widths for different spacers are chosen to accommodate the usual packing gaps found between loads. Convenient widths have been found to be 4, 6, 8, 10, and 12 inches.

Rib 20 is preferably formed of wood, such as a piece of wood lath, and is secured, as by gluing, to the top sheet, or strip, 18a in honeycomb 18.

Bars 22 are formed preferably of the same material as rib 20. These bars are pivoted to the top of the rib, at points spaced along the length thereof, by pivot pins 26. Such pins allow swinging of the bars, about generally upright axes 28, between what might be thought of as suspending positions (shown in FIGS. 1 and 2), and stored positions, shown in FIG. 4. In their suspending positions, the bars' opposite ends extend beyond the opposite sides of the honeycomb. In their stored positions, the bars overlie and substantially parallel rib 20.

The load spacer construction so far described, except for the inclusion of locking devices 24, is conventional, and is described in greater detail in U.S. Pat. No. 3,618,535. According to the present invention, however, this conventional construction is significantly modified, and improved with respect to its performance reliability, by the inclusion of such locking devices. As will become apparent, it is the key function of these locking devices to enable automatic releasable locking of bars 22 in their suspending positions.

Considering FIG. 2 along with FIG. 1, a locking device 24, also called a latch herein, takes the form of an angular springy metal plate, including a generally horizontal top portion 24a, and a downturned portion 24b. The plate is fastened to the top of a bar 22 by the same pivot pin used to pivot the bar to the rib. Top portion 24a extends to one side of bar 22, with downturned portion 22b extending downwardly along this side. The plate is fastened sufficiently tightly to the so that it moves therewith as a unit with swinging of the bar about its pivot axis 28. Any suitable means may, of course, be used to fasten a plate to a bar.

Further considering the construction of a locking device, the downturned portion thereof includes a central downwardly facing notch 24c, on either side of which is formed an upwardly and outwardly curving cam surface, or cam, 24d. Each notch 24c is shaped freely (yet closely) to receive rib 20, as shown in FIG. 2. A plate 24 and rib 20 are referred to herein collectively as a locking means, with the rib acting as a catch which works in cooperation with the notch in the plate.

As has already been mentioned, FIG. 1 illustrates spacer 16 in an operative condition between stacks 10, 12. In this condition bars 22 are in their suspending positions, wherein their ends extend beyond the sides of honeycomb 18, and over the tops of the cartons in the stacks. These bars, thus, through resting on the cartons, suspend the remaining parts in the spacer as shown, with honeycomb 18 expanded downwardly and hung in the space between the stacks. The spacer, thus, prevents cartons in the two stacks from shifting toward one another.

Most importantly, with the spacer in such a condition, locking devices 24 have their notches 24c receiving and thus caught by rib 20. As a consequence, bars 22 are locked in their suspending positions. The significance of this situation is that jostling during transit will not cause bars 22 to swing accidentally out of their suspending positions.

When it is desired to remove the spacer from use, it is a simple matter to do so simply by lifting it or moving it laterally out of space 14, collapsing the honeycomb, lifting the downturned portions of plates 24 to clear the notches and rib 20, and then swinging bars 22 to their stored positions (see FIG. 4). The spacer is then ready for storage.

To return the spacer to use, bars 22 are swung, for example, as shown in FIG. 3, to their suspending positions. With such swinging of a bar, in either direction, a cam surface 24d engages rib 20, causing upward bending of plate 24, with resultant climbing of the plate's downturned portion over the rib. When a bar reaches its suspending position, the downturned portion of its associated plate 24 snaps down, with its notch 24c then being caught by rib 20.

The proposed locking means thus obviates the transit problem mentioned earlier. Its incorporation in a load spacer of the type described eliminates the possibility of a suspension bar accidentally swinging out of its suspending position.

The configurations of parts may, of course, be changed to suit different specific load spacer constructions. For example, in spacers not using elongated top ribs, some other suitable catch means, such as a short block of wood, may be provided on opposite sides of the pivot pin for a suspension bar, to act as a catch. Other modifications within the spirit of the invention may be found by those skilled in the art.

It is claimed and desired to secure by Letters Patent:

1. In a load spacer for holding apart a pair of adjacent laterally spaced loads, where the spacer includes a spacing structure which is removably placeable between such loads, and an elongated suspension member pivoted intermediate its ends to the top of the spacing structure for swinging about a generally upright axis between a stored position where its extremities are disposed inwardly of the opposite sides of the spacing structure, and a suspending position where such extremities extend laterally beyond said opposite sides, whereby such extremities may rest on the tops of such loads thus to suspend the spacing structure between the loads, the improvement comprising means for automatically and releasably locking said suspension member in said suspending position with swinging of the member to such position from said stored position, said means including a resilient latch mounted on said suspension member for swinging therewith, capable of elastic bending away from the suspension member in a direction substantially normal to the plane in which the member can swing, and a catch fastened to the top of said spacing structure adjacent said suspension member, operable releasably to catch said latch with movement of said suspension member to said suspending position, thus releasably to lock the suspension member in said suspending position, movement of said suspension member toward its said suspending position causing engagement of said latch and catch, with resultant bending and climbing of the former over the latter to become caught by the latter.

2. The spacer of claim 1, wherein the latch includes a notch, and the catch is shaped to be releasably caught within said notch with said suspension member in said suspending position.

3. The spacer of claim 2, wherein the latch further includes a cam on at least one side of said notch for facilitating bending and climbing of the latch over said catch during movement of the suspension member toward said suspending position.

4. The spacer of claim 2, wherein the latch further includes a pair of cams disposed on opposite sides of said notch for facilitating bending and climbing of the latch over said catch during movement in either direction of the suspension member toward said suspending position.

5. The spacer of claim 4 which further includes another suspension member and a locking means therefor similar, respectively, to the first-mentioned suspension member and locking means.

6. In a load spacer for holding apart a pair of adjacent laterally spaced loads, where the spacer includes an expandable-collapsible spacing structure which is removably placeable between such loads,
- an elongated rib joined to and extending along the top of said spacing structure,
- an elongated suspension member pivoted between its ends to the top of said rib for swinging about a generally upright axis between a stored position where its extremities are disposed inwardly of the opposite sides of the spacing structure, and a suspending position where such extremities extend laterally beyond said opposite sides, whereby such extremities may rest on the tops of such loads, thus to suspend the spacing structure between the loads, and
- a locking device for releasably locking said suspension member in said suspending position, said device comprising a springy plate fastened to said suspension member for swinging therewith and including a downturned portion disposed laterally outwardly of one side of said suspension member, springiness in said plate urging said downturned portion toward the top of said spacing structure and allowing elastic bending of the plate away from the suspension member,
- said downturned portion including a notch shaped releasably to receive and catch said rib with said suspension member in said suspending position, and on opposite sides of said notch a pair of cams enabling climbing of said downturned portion, with resultant bending in said plate, over said rib during movement in either direction of said suspension member toward said suspending position.

7. The spacer of claim 6 which further includes another suspension member and locking device similar, respectively, to said first-mentioned suspension member and locking device.

* * * * *